United States Patent [19]
Altvater et al.

[11] Patent Number: 5,698,233
[45] Date of Patent: Dec. 16, 1997

[54] ROLL-TYPE PRESS FOR EXTRUDING A FILLED OR A MULTI-LAYER STRAND OF FATTY COMPOSITIONS

[75] Inventors: Frank Altvater, Heilbronn; Günter Fux, Güglingen, both of Germany

[73] Assignee: Bepex, GmbH, Leingarten, Germany

[21] Appl. No.: 535,175

[22] PCT Filed: Sep. 24, 1993

[86] PCT No.: PCT/EP93/02592

§ 371 Date: Oct. 24, 1995

§ 102(e) Date: Oct. 24, 1995

[87] PCT Pub. No.: WO94/25247

PCT Pub. Date: Nov. 10, 1994

[30] Foreign Application Priority Data

May 4, 1993 [DE] Germany .................. 43 14 726.7

[51] Int. Cl.[6] .................................................. B29C 47/06
[52] U.S. Cl. ................... 425/130; 425/131.1; 425/133.1
[58] Field of Search .............................. 425/130, 131.1, 425/133.1, DIG. 55

[56] References Cited

U.S. PATENT DOCUMENTS

| | | | |
|---|---|---|---|
| 660,717 | 10/1900 | Barber et al. | 425/131.1 |
| 4,264,294 | 4/1981 | Ruiz | 425/DIG. 55 |
| 4,647,467 | 3/1987 | Pinto | 425/131.1 |
| 4,687,429 | 8/1987 | Simelunas | 425/133.1 |
| 4,748,031 | 5/1988 | Koppa | 426/283 |

FOREIGN PATENT DOCUMENTS

| | | |
|---|---|---|
| 0202143 | 11/1986 | European Pat. Off. . |
| 2564031 | 11/1985 | France . |
| 1134824 | 3/1963 | Germany . |
| 1262572 | 3/1968 | Germany . |

*Primary Examiner*—Jay H. Woo
*Assistant Examiner*—Iurie A. Schwartz
*Attorney, Agent, or Firm*—Oppedahl & Larson

[57] ABSTRACT

Within a casing (10), on each side of a center plane (A), a feeding channel (26, 28) and a pressure channel (32, 34) are defined. The pressure channels (32, 34) are converging in the direction of a jet arrangement (40). Further, within the casing (10), on each side of the center plane (A), a first and a second rotatably driven feeding roll (42, 44), respectively, are disposed each between one of the feeding channels (26, 28) and the associated pressure channel (32, 34). The feeding rolls (42, 44) have their axes of rotation define a transverse plane (B). Two additional rotatably driven rolls (52, 54), disposed within the casing (10) on one side each of the center plane (A), define together with one each of the feeding rolls (42, 44) a nib (62, 64). On the side of the transverse plane (B) which is remote from the jet arrangement (40), at least a third rotatably driven feeding roll (46) is provided, having assigned to it a third inlet channel (30) and a third pressure channel (36). The third pressure channel (36) runs between the first and second feeding rolls (42, 44) to lead to the jet arrangement (40). Accordingly, the roll-type press is capable of gently processing more than two compositions at the same time for producing a filled or multi-layer strand.

11 Claims, 2 Drawing Sheets

5,698,233

ROLL-TYPE PRESS FOR EXTRUDING A FILLED OR A MULTI-LAYER STRAND OF FATTY COMPOSITIONS

BACKGROUND OF THE INVENTION

The present invention relates to a roll-type press for extruding a filled or multi-layer strand of plastic compositions, said press comprising a casing which contains on either side of a center plane one inlet channel and one pressure channel each, a jet arrangement, in the direction of which the pressure channels converge, a first rotatably driven feeding roll and a second rotatably driven feeding roll which are arranged within the casing on each side of the center plane between one of the inlet channels and the associated pressure channel and have their axes of rotation defining a transverse plane, and two additional rotatably driven rolls which are arranged within the casing each on one side of the center plane and form together each with one of the feeding rolls one nib each.

In a roll-type press of the aforementioned kind as disclosed in DE-AS 12 62 572, a first feeding roll and a second feeding roll are arranged symmetrically to and at a small lateral distance from a vertical center plane, and above each of said feeding rolls an applicator roll having a saw-tooth shaped roll profile is arranged, also in a symmetrical fashion in respect of the center plane and at the smallest possible distance therefrom. In this manner, two nibs are defined through which a plastic composition each from a farther outwardly disposed inlet channel will be fed in a downwardly inclined direction towards the center plane. The two composition flows are kept separate from each other by guide plates placed between the feeding rolls, until they discharge, below the feeding rolls, into a common jet arrangement from which they will be extruded in the form of a two-layer strand.

The object of the present invention is to further develop a roll-type press in such a manner that it is enabled to gently process more than two compositions at the same time to a filled or multi-layer strand.

According to the present invention, this object is attained on the basis of a roll-type press of the kind mentioned thereabove in that on the side of the transverse plane remote from the jet arrangement at least a third feeding roll is arranged to which a third inlet channel and a third pressure channel are assigned, and in that the third pressure channel runs between the first and the second feeding roll to lead to the jet arrangement.

SUMMARY OF THE INVENTION

The present invention is based on the realization that room for a third feeding channel can be made available between the first and the second feeding rolls without the first or the second pressure channel needing to become considerably extended as compared with the roll-type press presumed to be known (DE-AS 12 62 572). The third feeding roll and, if necessary, another roll associated with it, for example an applicator roll, can be disposed as a compact unitary assembly above the first and the second feeding roll and the additional rolls therewith associated in such a manner that neither the third pressure channel would be excessively long.

Further modifications of the present invention are defined in the claims.

BRIEF DESCRIPTION OF THE DRAWINGS

In the following, embodiments of the present invention will be described with reference to schematic drawings.

DETAILED DESCRIPTION OF THE INVENTION

Figure 1:
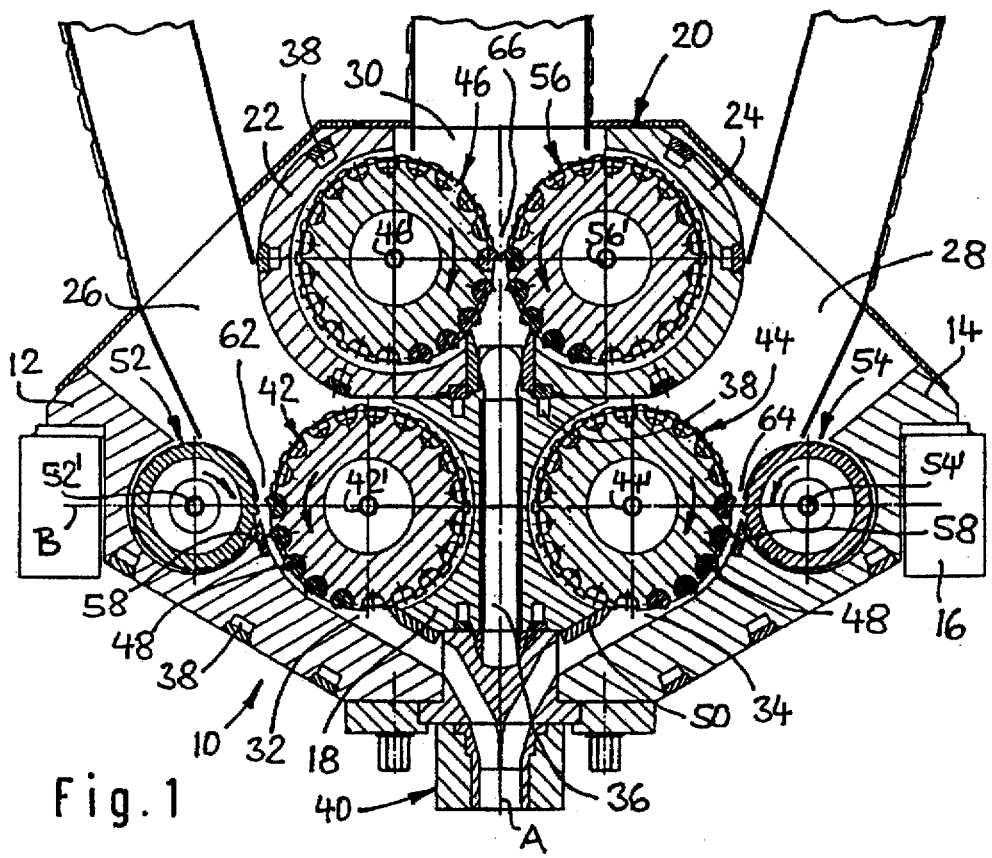
In FIGS. 1 through 3 three different roll-type presses each designed for three different compositions are illustrated each in a vertical section view.

Each one of the three roll-type presses illustrated has a casing 10 which is built up, in a symmetrical manner with respect to a vertical center plane A, of a left-hand casing half 12 and a right-hand casing half 14, and is supported by a frame 16. As shown in FIG. 1, a lower casing insert 18 and an upper casing insert 20 are installed into the casing 10, both said inserts also being symmetrically configured relative to the center plane A; the lower casing insert 18 is an integral element, whereas the upper casing insert 20 is composed of a left-hand insert part 22 and a right-hand insert part 24. The upper casing insert 20 can be removed from the casing 10 as a unit, without the casing halves 12 and 14 needing to be separated from each other or from the lower casing insert 18.

Inside the casing 10 there is defined one each inlet channel 26 and 28, respectively, between the left-hand casing half 12 and the left-hand insert part 22 and between the right-hand casing half 14 and the right-hand insert part 24; both insert parts 22 and 24 define together a center inlet channel 30. The three inlet channels 26, 28 and 30 are each linked with a pressure channel 32, 34 and 36, respectively, the center pressure channel 36 being a straight downward extension of the centre inlet channel 30, as shown in FIG. 1. The casing 10 as well as both casing inserts 18 and 20 have formed therein channels 38 through which a fluid for temperature equalization, that is for selectively heating or cooling can be flown through. The three pressure channels 32, 34 and 36 discharge into a common jet arrangement 40 which can be removed without dismantling the casing 10 and which can be designed to selectively extrude three different compositions in a multi-layer or coaxial fashion.

As shown in FIG. 1, the lower casing insert 18 has two oppositely facing, part-cylindrical lateral recesses which together with the left-hand casing half 12 and the right-hand casing half 14, respectively define a space for accommodating a first feeding roll 42 and a second feeding roll 44, respectively. Both feeding rolls 42 and 44 are symmetrically arranged relative to center plane A, and are capable of being rotatably driven in synchronism, but in opposite directions as shown by the arrows, each around a rotational axis 42' and 44', respectively, parallel to the center plane A. The axes of rotation 42' and 44' are contained in a common horizontal transverse plane B. With each of the three embodiments shown, at least one third feeding roll 46, capable of being rotatably driven around a horizontal axis of rotation 46' is arranged at a distance above the transverse plane B. The axis of rotation 46' may lay within the center plane A. For all embodiments illustrated, the feeding rolls 42, 44 and 46 are of equal size.

Figure 2:
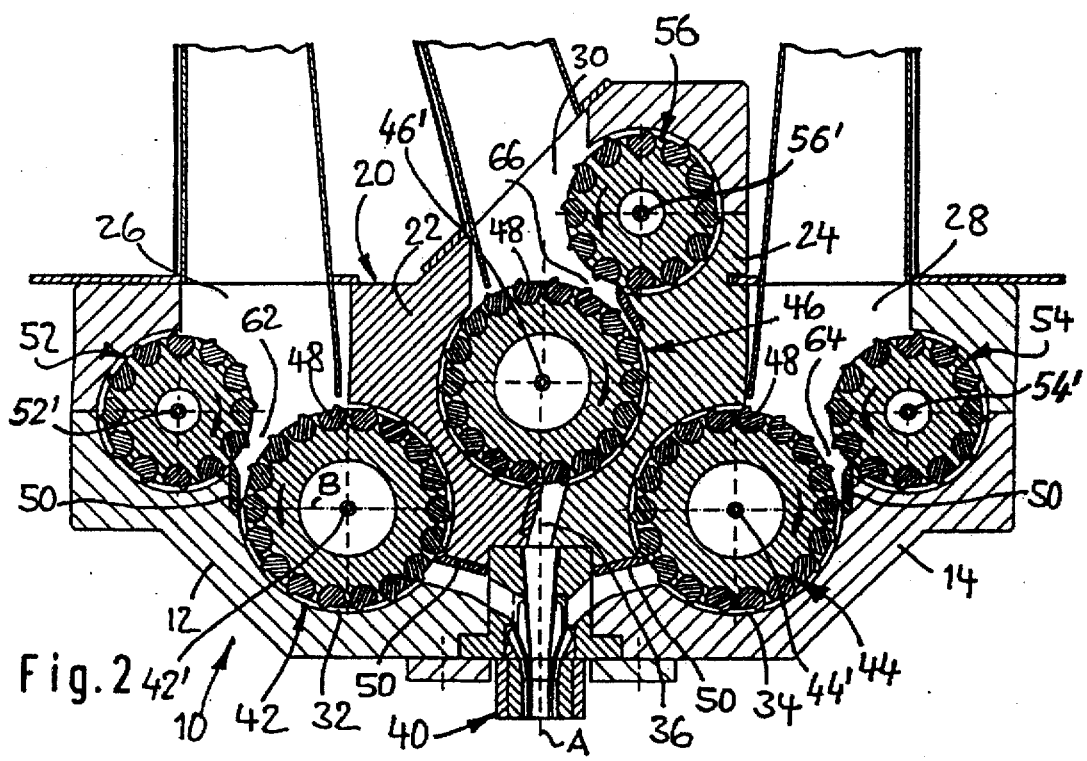

With reference to FIGS. 1 and 2, a great number of rotary bars 48 is mounted in each feeding roll 42, 44 and 46; each of said rotary bars defines a conveyor ridge and cooperates with a stationary stripper 50 once in a revolution of the feeding rolls and, in so doing, carries out an alternate rotary movement. Inasmuch as this is concerned, the feeding rolls 42, 44 and 46 correspond with those known from DE-AS 12 62 572 and DE-AS 11 34 824 already mentioned.

With all of the three embodiments shown, each of the two feeding rolls 42 and 44 has associated with it an applicator roll 52 and 54, respectively, which is capable of being rotatably driven in the direction of the arrow around a rotational axis 52' and 54', respectively. In each case, said axes of rotation 52' and 54' are parallel with the axes of rotation 42' and 44' and are contained in the transverse plane B in the case of FIG. 1, but in the case of FIGS. 2 and 3, they are placed at an approximate distance D/2 above the transverse plane B, where D identifies the feeding roll diameter. In one embodiment, the axes of rotation 52', 54' of the two additional rolls 52, 54 are spaced farther from the center plane A than the axes of rotation 42', 44' of the feeding rolls 44 and are separated from the transverse plane B by a distance of at most (D+d)/2, where D defines the diameters of the respective feeding rolls 42, 44 and d defines the diameter of the additional roll 52, 54.

Figure 3:
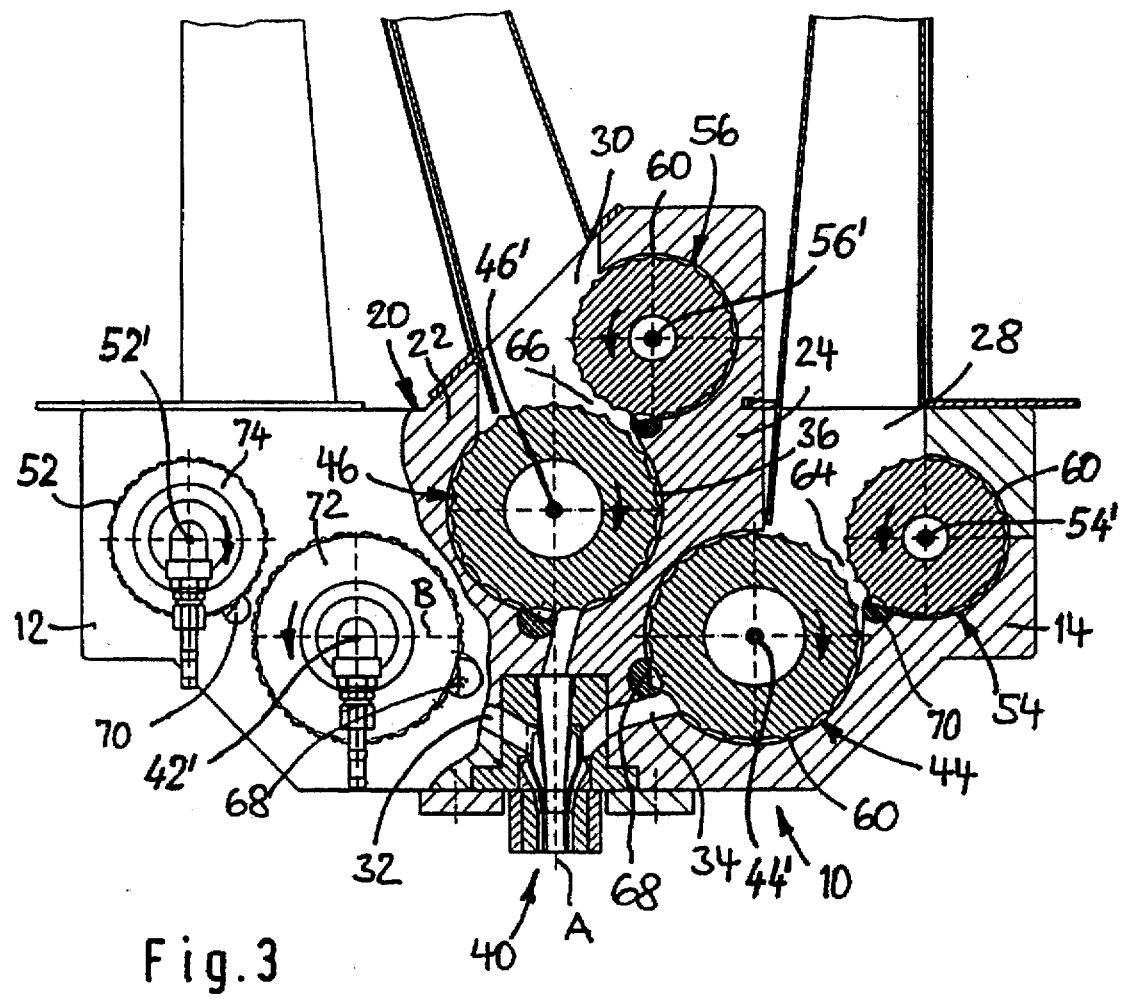

Apart from the three feeding rolls 42, 44 and 46 and the two applicator rolls 52 and 54, as disclosed so far, each of the roll-type presses illustrated has another roll 56 which is a fourth feeding roll of equal size as the feeding rolls 42, 44 and 46, as shown in FIG. 1, but is an applicator roll of equal size as the applicator rolls 52 and 54, as shown in FIGS. 2 and 3.

With reference to FIG. 1, said further roll 56 is provided with rotary bars 48, as are the feeding rolls 42, 44 and 46. This arrangement is advantageous in that, among other things, compositions containing coarse constituents, such as crushed nuts, small-size nuts or pieces of fruit can be fed by the two rolls 46 and 56 through the adjoining center pressure channel 36 to the jet arrangement 40. Preferably, the pressure channel 36 is made from a tube of PTFE (polytetrafluoroethylene) or from a similar slip enhancing material and is completely straight so that even in the case of feeding such compositions flow resistances are kept low.

Instead of rotary bars 48, all, or only some, of the feeding and applicator rolls mentioned can have a rigid roll profile which is formed by longitudinal conveyor ledges or ridges and intermediate recesses, parallel to the axis. Thus, in the roll-type press shown in FIG. 1, the two applicator rolls 52 and 54 are provided with a saw-tooth shaped roll profile 58, whereas in the roll-type press illustrated in FIG. 3, all of the feeding rolls 42, 44 and 46 as well as their cooperating applicator rolls 52, 54 and 56 have an undulated roll profile 60. Irrespective of details of the configuration of the rolls, the two cooperating rolls 42, 52 as well as 44, 54 and 46, 56 of each pair of rolls define therebetween a nib, respectively, 62 or 64 or 66.

With reference to FIG. 3, a part-cylindrical stripper bar 68 each is assigned to the feeding rolls 42, 44 and 46, whereas the applicator rolls 52, 54 and 56, generally of a smaller diameter, have associated with each of them a part-cylindrical stripper bar 70 of a smaller diameter. The stripper bars 68 and 70 have each a stationary axis of rotation of parallel extension with the axis of rotation of the respective roll, and they are controlled to carry out alternate rotations about their axis in which they follow and scrape the profile of the turning associated roll. Thus, the stripper bars 68 are each controlled by a cam disk 72 connected for common rotation with the respective feeding roll 42 or 44 or 46, and the stripper bars 70 are each controlled by a cam disk 74 connected for common rotation with the respective applicator roll 52 or 54 or 56. Details of this control arrangement will be found in the applicants patent application of same priority (patent attorney's reference: 1A-70 033).

In comparison with the roll-type press shown in FIG. 1, the one illustrated in FIG. 2 has the advantage that each of the three pressure channels 32, 34 and 36 are of substantially equal length and shape and extend around the respective feeding roll 42 or 44 or 46 through a considerable angular distance of nearly 180° so that on each roll about half of the total number of rotary bars 48 disposed on it act to cause pressure build-up in the composition being conveyed. With the assistance of the associated applicator rolls 52, 54 and 56, the feeding rolls 42, 44 and 46 of FIG. 2 are able to convey compositions with a very high degree of efficiency even against a higher back pressure of the jet arrangement 40. For this reason, the roll-type press illustrated in FIG. 2 is particularly suitable for processing highly fatty compositions, such as almond and nut based cocoa-flavored paste as well as buttercream and similar compositions.

With few limitations, the same holds good also for the roll-type press shown in FIG. 3 which, when compared with that illustrated in FIG. 2, has the advantage of a considerably reduced technical expenditure and thus of lower manufacturing cost.

We claim:

1. A roll-type press for extruding a filled or multi-layer strand of plastic compositions, said press comprising:

a casing (1) which defines a center plane (A) and which contains on each side thereof an inlet channel (26, 28) and a pressure duct 32, 34, a jet arrangement (40) into which the pressure ducts (32, 34) discharge, first and second rotatably driven feed rolls (42, 44) which are arranged within the casing (10) on opposing sides of the center plane (A), said first and second rotatably driven feed rolls having axes of rotation (42', 44') defining a transverse plane (B), first and second rotatably driven applicator rolls (52, 54) which are arranged in the casing (10) on opposing sides of the center plane (A), each applicator roll (52, 54) together with one of the first and second feed rolls (42, 44) forming a nib (62, 64) located where an associated one of the inlet channels ends and an associated one of the pressure ducts (32, 34) begins, said first and second applicator rolls (52, 54) having axes of rotation (52', 54') disposed farther away from the center plane (A) than the axes of rotation (42', 44') of the first and second feed rolls (42, 44), a third rotatably driven feed roll (46) and a third rotatably driven applicator roll (56) disposed on the side of the transverse plane (B) remote from the jet arrangement (40), and a third inlet channel (30) and a third pressure duct (36) associated with the third feed roll (46) and the third applicator roll (56), said third pressure duct (36) running between said first and second feeding rolls (42, 44) to lead to the jet arrangement (40), wherein the third feeding roll (46) has an axis of rotation (46') contained within the center plane (A), the axes of rotation (52', 54') of the first and second applicator rolls (52,54) are disposed on the side of the transverse plane (B) remote from the jet arrangement (40), and each of the three pressure ducts (32, 34, 35) extends around the associated one of the three feeding rolls (42, 44, 46) through an angular distance of about 180 degrees.

2. A roll-type press according to claim 1, wherein the axes of rotation (52', 54') of the first and second applicator rolls (52, 54) are spaced at a distance of about (D+d)/2 from the transverse plane (B), and wherein D defines the diameter of the respective feeding rolls (42, 44) and d defines the diameter of the applicator rolls (52, 54) concerned.

3. A press according to claim 1, wherein the first, second and third pressure ducts are of substantially equal length and shape.

4. A press according to claim 2, wherein the first, second and third pressure ducts are of substantially equal length and shape.

5. A roll-type press according to claim 1, wherein at least each of the feeding rolls (42, 44, 46) have mounted therein a plurality of rotary bars (48), each of said rotary bars (48) constituting a conveyor ledge parallel to the axis of the feeding roll in which the rotary bar is mounted.

6. A roll-type press according to claim 1, wherein all of the rolls (42, 44, 46; 52, 54, 56) have a roll profile (58 and 60, respectively) formed of rigid conveyor ledges and intermediately disposed recesses, and wherein each of the rolls cooperates with a stationarily supported, parallel, alternately rotating stripper bar (68 and 70, respectively).

7. A roll-type press according to claim 1, wherein the casing (10) contains a central casing insert (20) which is removable independently from the first and the second feeding roll (42, 44) and from the associated additional rolls (52, 54), and in which are supported the third feeding roll (46) and a roll (56) defining with the latter a third nib (66).

8. A roll-type press according to claim 2, wherein the third feeding roll (46) has an axis of rotation (46') that is contained in the center plane (A).

9. A roll-type press according to claim 2, wherein at least each of the feeding rolls (42, 44, 46) have mounted therein a plurality of rotary bars (48), each of said rotary bars (48) constituting a conveyor ledge parallel to the axis of the feeding roll in which the rotary bar is mounted.

10. A roll-type press according to claim 2, wherein all of the rolls (42, 44, 46; 52, 54, 56) have a roll profile (58 and 60, respectively) formed of rigid conveyor ledges and intermediately disposed recesses, and wherein each of the rolls cooperates with a stationarily supported, parallel, alternately rotating stripper bar (68 and 70, respectively).

11. A roll-type press according to claim 2, wherein the casing (10) contains a central casing insert (20) which is removable independently from the first and second feeding rolls (42, 44) and from the associated additional rolls (52, 54), and in which are supported the third feeding roll (46) and a roll (56) defining with the latter a third nib (66).

* * * * *